(12) United States Patent
D'Arcy et al.

(10) Patent No.: US 10,274,221 B1
(45) Date of Patent: Apr. 30, 2019

(54) HEAT EXCHANGER

(71) Applicant: MITEK HOLDINGS, INC., Wilmington, DE (US)

(72) Inventors: Marcus D'Arcy, Spring Hill, FL (US); Onieluan Tamunobere, Tampa, FL (US)

(73) Assignee: MITEK HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/852,503

(22) Filed: Dec. 22, 2017

(51) Int. Cl.
*F28D 15/00* (2006.01)
*F24F 12/00* (2006.01)
*F28D 15/02* (2006.01)

(52) U.S. Cl.
CPC ........ *F24F 12/002* (2013.01); *F28D 15/0266* (2013.01); *F24F 2012/005* (2013.01); *F28D 2015/0216* (2013.01)

(58) Field of Classification Search
CPC .. F25B 39/00; F28D 15/0275; F28D 15/0266; F28D 2015/0216; F24F 1/0059; F24F 12/002; F24F 2012/005
USPC .................................................... 165/104.21
See application file for complete search history.

(56) References Cited

U.S. PATENT DOCUMENTS

| | | | |
|---|---|---|---|
| 3,964,921 A * | 6/1976 | Persinski | ............. C04B 24/003 106/719 |
| 4,222,436 A | 9/1980 | Pravda | |
| 4,771,824 A | 9/1988 | Rojey et al. | |
| 5,404,938 A | 4/1995 | Dinh | |
| 5,826,443 A | 10/1998 | Ares et al. | |
| 5,845,702 A | 12/1998 | Dinh | |
| 5,921,315 A | 7/1999 | Dinh | |
| 6,109,044 A | 8/2000 | Porter et al. | |
| 6,170,688 B1 | 7/2001 | Olden | |
| 6,591,902 B1 * | 7/2003 | Trent | .................... F24F 1/0059 165/104.14 |
| 6,745,830 B2 | 6/2004 | Dinh | |
| 7,748,436 B1 | 7/2010 | Anderson et al. | |
| 2004/0035558 A1 * | 2/2004 | Todd | ................... F28D 15/0275 165/104.26 |

(Continued)

OTHER PUBLICATIONS

Energy Recovery Systems, Advanced Cooling Technologies, Inc., 1046 New Holland Avenue, Lancaster, Pennsylvania 17601, www.1-ACT.com/HVAC, Info@1-ACT.com, 8 pages.

(Continued)

*Primary Examiner* — Davis D Hwu
(74) *Attorney, Agent, or Firm* — Stinson Leonard Street LLP

(57) ABSTRACT

A heat exchanger for exchanging heat between air streams in two horizontally spaced ducts of a ventilation system. The heat exchanger includes a plurality of single-loop heat pipes, each with top and bottom legs extending along a heat pipe axis. A frame permanently mounts the heat pipes in the ventilation system so that sections of the legs are received in each duct and the legs are inclined with respect to a horizontal axis. The frame can define a non-rectangular interior. Heat pipe mounting features spaced apart along a width of the frame that can be offset along the height of the frame. A top or bottom of the frame can have an inclined inner side. In use, the frame is arranged in the ducts so that the inclined heat pipes provide whole-year heat recovery in cooling and heating modes.

20 Claims, 5 Drawing Sheets

(56) References Cited

U.S. PATENT DOCUMENTS

| | | |
|---|---|---|
| 2007/0028626 A1 | 2/2007 | Chen |
| 2012/0186785 A1 | 7/2012 | Dinh et al. |
| 2013/0327503 A1* | 12/2013 | Koch ..................... F25B 39/00 |
| | | 165/104.21 |
| 2014/0116653 A1 | 5/2014 | Lange et al. |
| 2015/0077938 A1 | 3/2015 | Espersen |

OTHER PUBLICATIONS

Eng A, Engineered Air, Installation, Operation and Maintenance Manual for Q-TRAC Model 1, Heat Pipe Control Indoor and Outdoor Models, USA Head Office and Factory, 32050 W. 83rd St., Desoto, Kansas 66018, 19 pages.

* cited by examiner

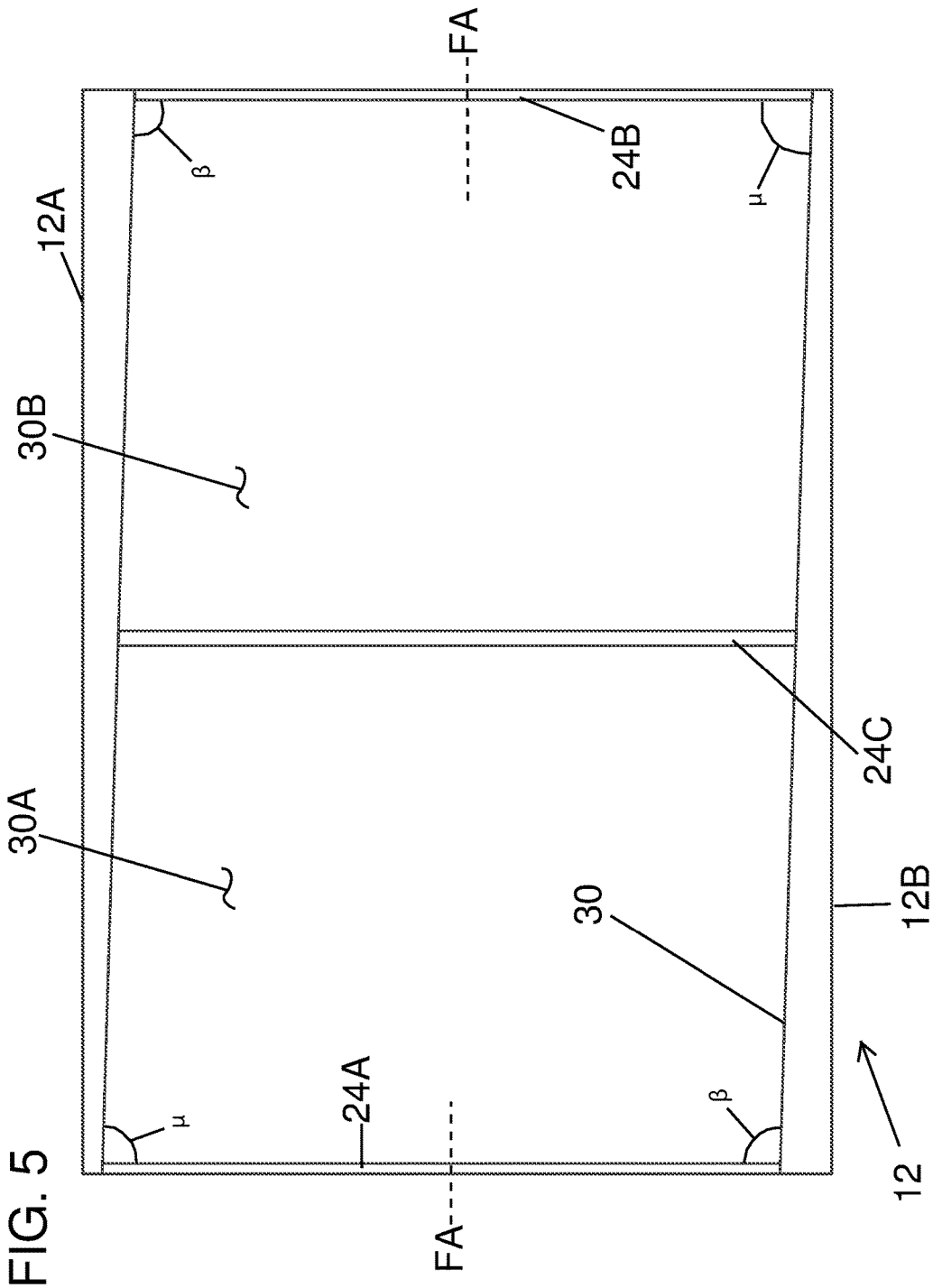

HEAT EXCHANGER

FIELD

This disclosure generally relates to a heat exchanger that provides heat recovery in a climate control system and more specifically to a heat pipe heat exchanger that orients heat pipes at an incline.

BACKGROUND

Heat exchangers can be used in climate control systems to transfer heat between warm and cool air streams flowing through different ducts of the system. For example, a heat exchanger can be used to transfer heat between an exhaust air stream flowing through an exhaust air duct and a supply air stream (e.g., return air and/or outside air) flowing through a supply air duct. This concept is generally referred to as heat recovery. The exhaust air stream and supply air stream will typically be at different temperatures. For example, when a climate control system is being used for heating a building, the exhaust air stream will be relatively warm and the supply air stream will be relatively cool. In this situation, a heat exchanger can be used to transfer heat from the exhaust air stream to the supply air stream to heat the supply air stream before it is fully heated by a heater. In this way, heat is recovered from the warm exhaust air and used to warm the incoming supply air. Conversely, when a ventilation system is used for cooling a building, the exhaust air stream will be relatively cool and the supply air stream will be relatively warm. In this situation, the heat exchanger can be used to transfer heat from the supply air stream to the exhaust air stream to cool the supply air stream before it is further cooled by an air conditioner. In this way, heat is moved from the incoming supply air stream to the exhaust air stream to pre-cool the incoming supply air stream. Some ventilation systems are used for both heating and cooling a building over the course of a year.

SUMMARY

In one aspect, a heat exchanger for exchanging heat between first and second air streams respectively flowing through first and second ducts of a ventilation system that are spaced apart along a horizontal axis comprises a plurality of heat pipes. Each heat pipe has first and second end portions spaced apart along a heat pipe axis and top and bottom legs extending along the heat pipe axis between the first and second end portions and having first and second end sections connected to the first and second end portions, respectively. A frame mounts the heat pipes. The frame is configured for installation in the ventilation system in a horizontal orientation in which the frame fixes each heat pipe so that the first end sections of the top and bottom legs are received in the first duct for thermal communication with the first air stream, the second end sections of the top and bottom legs are received in the second duct for thermal communication with the second air stream, and the heat pipe axis is inclined with respect to the horizontal axis such that the first end sections are positioned above the second end sections In another aspect, a heat exchanger for exchanging heat between first and second air streams respectively flowing through first and second ducts of a ventilation system that are spaced apart along a horizontal axis comprises a plurality of heat pipes. Each heat pipe has first and second end portions spaced apart along a heat pipe axis and top and bottom legs extending along the heat pipe axis between the first and second end portions and having first and second end sections connected to the first and second end portions, respectively. A frame mounts the heat pipes. The frame has a horizontal axis and is configured for installation in the ventilation system in a horizontal orientation such that the horizontal axis of the frame extends generally parallel to the horizontal axis of the first and second ducts of the ventilation system. The heat pipe axis is inclined with respect to the horizontal axis of the frame such that the heat pipe axis extends at an angle to the horizontal axis of the frame when the frame is installed in the ventilation system.

In another aspect, a method can improve efficiency in a ventilation system of a climate control system that is configured to operate in a cooling mode and a heating mode during a year. The ventilation system comprises a supply air duct for receiving a supply air stream and an exhaust air duct for receiving an exhaust air stream that is spaced apart from the supply air duct along a horizontal axis. The method comprises installing a heat exchanger comprising a plurality of heat pipes in the ventilation system. Each heat pipe extends in a single continuous loop and has top and bottom legs extending along a heat pipe axis. The step of installing the heat exchanger comprises mounting each heat pipe in the ventilation system so that a first end section of each of the top and bottom legs is in thermal communication with the supply air stream, a second end section of each of the top and bottom legs is in thermal communication with the exhaust air stream, and the heat pipe is permanently fixed in the ventilation system so that the heat pipe axis is inclined with respect to the horizontal axis.

Other aspects will be in part apparent and in part pointed out hereinafter.

BRIEF DESCRIPTION OF THE DRAWINGS

FIG. 5 is an elevation of the frame assembly.

Corresponding reference characters indicate corresponding parts throughout the drawings.

DETAILED DESCRIPTION

Figure 1:
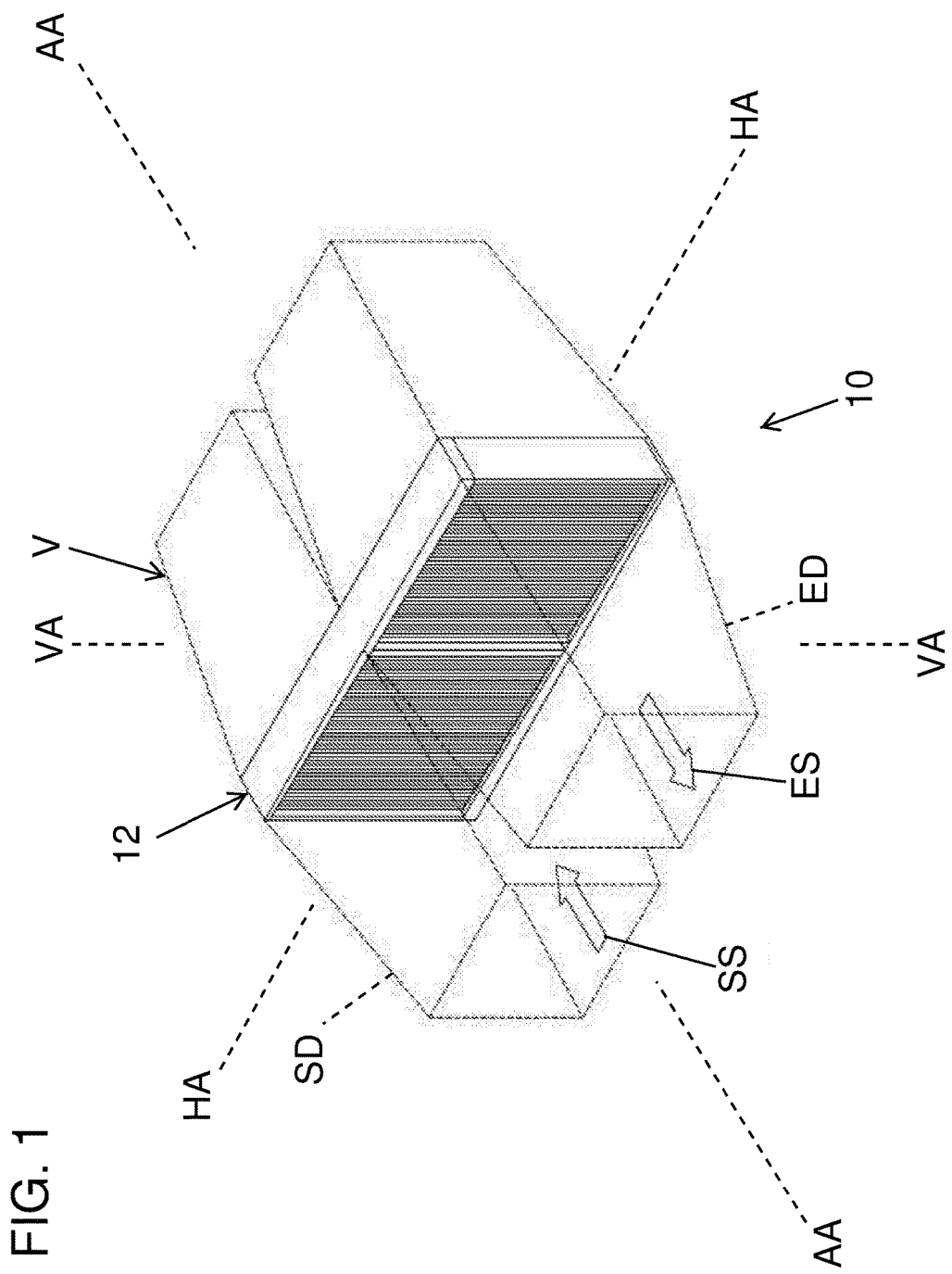
FIG. 1 is a perspective of a heat exchanger installed in a ventilation system illustrated in broken line.

Referring to FIG. 1, one embodiment of a heat pipe heat exchanger is generally indicated at reference number 10. The heat exchanger 10 is installed to provide heat recovery in a ventilation system V of a forced air climate control system that operates during the course of a year in both a cooling mode and a heating mode. The ventilation system V includes a supply air duct SD (broadly, a first air duct) and an exhaust air duct ED (broadly, a second air duct). The ducts SD, ED are arranged side-by-side such that the ducts are spaced apart along a horizontal axis HA and disposed at a common height along a vertical axis VA. In general, the ducts SD, ED are configured to receive air streams SS, ES of different temperatures (e.g., a warm air stream and a cool air stream). The supply air duct SD is configured to guide a supply air stream SS including unconditioned air (e.g., environmental air, return air, or a combination thereof) to a heating or cooling unit of the climate control system and the exhaust air duct ED is configured to guide an exhaust air stream ES including previously conditioned air (e.g., stale air) out of the building. The illustrated heat exchanger 10 includes a frame, generally indicated at 12, that mounts a plurality of single-loop heat pipes, each generally indicated at 14 (FIGS. 2 and 3), to provide heat recovery by transferring heat between the warmer of the supply and exhaust air streams SS, ES and the cooler of the air streams. As will be explained in further detail below, the frame 12 mounts the heat pipes 14 in the ventilation system V at an incline with respect to the horizontal axis HA to enhance the heat recovery over the course of a year.

Figure 3:
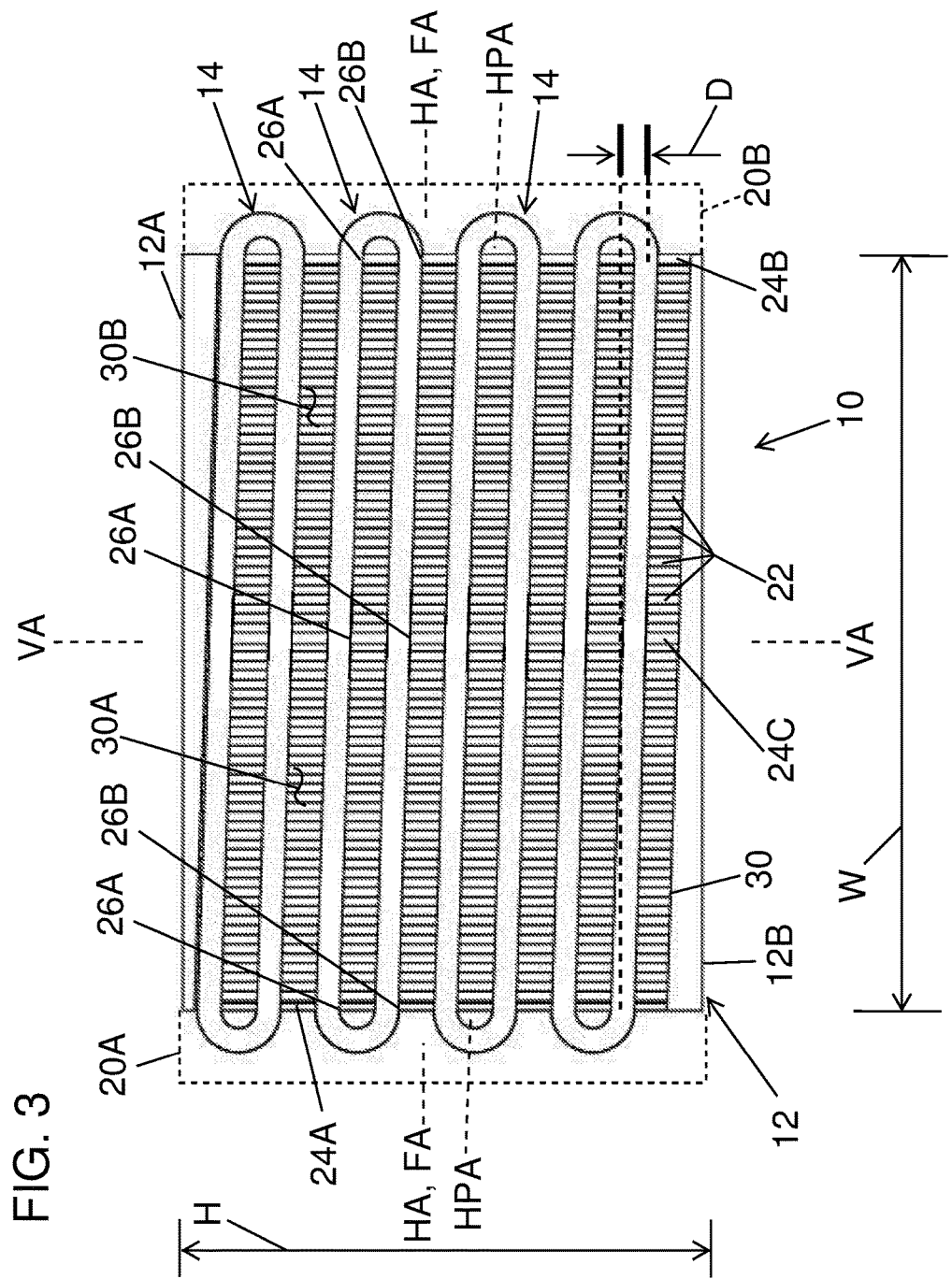
FIG. 3 is a widthwise vertical cross section of the heat exchanger taken through a row of heat pipes of the heat exchanger with side members of a frame illustrated in broken line.
Figure 4:
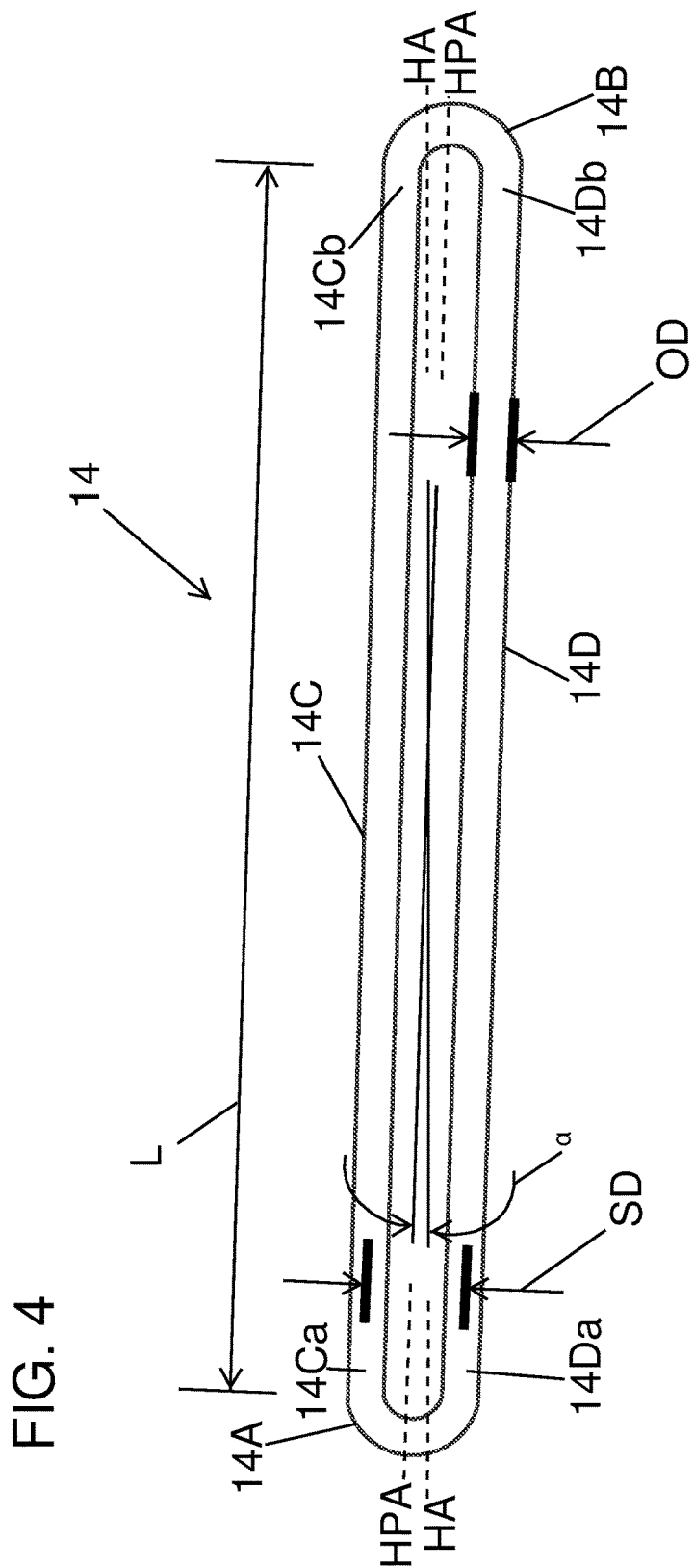
FIG. 4 is an elevation of a heat pipe of the heat exchanger with the heat pipe shown in the orientation in which the heat pipe is disposed in the heat exchanger.

Referring to FIG. 4, each of the heat pipes 14 comprises one or more tubes arranged as a single continuous loop and charged with a refrigerant suitable for the normal operating temperatures of the ventilation system V. In the illustrated embodiment, each of the loops has a substantially identical obround shape. Each heat pipe 14 has a first end portion 14A and a second end portion 14B spaced apart along a heat pipe axis HPA and a top leg 14C and a bottom leg 14D that extend generally along the heat pipe axis between the first and second end portions. The top and bottom legs 14C, 14D are substantially straight, and the first and second end portions 14A, 14B are arcuate. Each of the top leg 14C and the bottom leg 14D has a first end section 14Ca, 14Da that is connected to the first end portion 14A of the heat pipe and a second end section 14Cb, 14Db that is connected to the second end portion 14B of the heat pipe. Each heat pipe 14 thus defines a continuous refrigerant flow path that extends from the first end portion 14A through the top and bottom legs 14C, 14D to the second end portion 14B. As will be explained in further detail below, when the heat exchanger 10 is mounted horizontally in the ventilation system V, the frame 12 is configured to fix the heat pipes 14 in the ventilation system such that the heat pipe axes HPA are oriented at an angle of incline a with respect to the horizontal axis HA (FIGS. 3 and 4) and a horizontal axis FA (FIG. 5) of the frame. In the inclined orientation of the heat pipe 14, the first end sections 14Ca, 14Da of the top and bottom legs 14C, 14D form upper end sections thereof and the second end sections 14Cb, 14Db form lower end sections thereof, each of which is located below the respective upper end section along the vertical axis VA.

In certain embodiments, each heat pipe 14 has an elongate and slender shape. For example, in certain embodiments and applications, the heat pipe 14 has an outer diameter OD in an inclusive range of from about 0.375 inches to about 1.0 inches. Each of the top and bottom legs of the heat pipe can have a length L in an inclusive range of from about 7.5 inches to about 300 inches. The ends 14A, 14B of each heat pipe 14 can be sized so that an on-center spacing distance SD between the top and bottom legs 14C, 14D is in an inclusive range of from about 1.0 inches to about inches 3.0. It will be appreciated that the illustrated heat pipes 14 may not be drawn to the scale of certain embodiments having dimensions OD, L, SD in the ranges set forth above. Furthermore, in the drawings, the heat exchanger 10 is configured in such a way as to clearly illustrate certain features, such as the incline of the heat pipes, etc. It will be understood that other embodiments of the heat exchanger can have other configurations (e.g., a less pronounced heat pipe incline) without departing from the scope of the invention.

Figure 2:
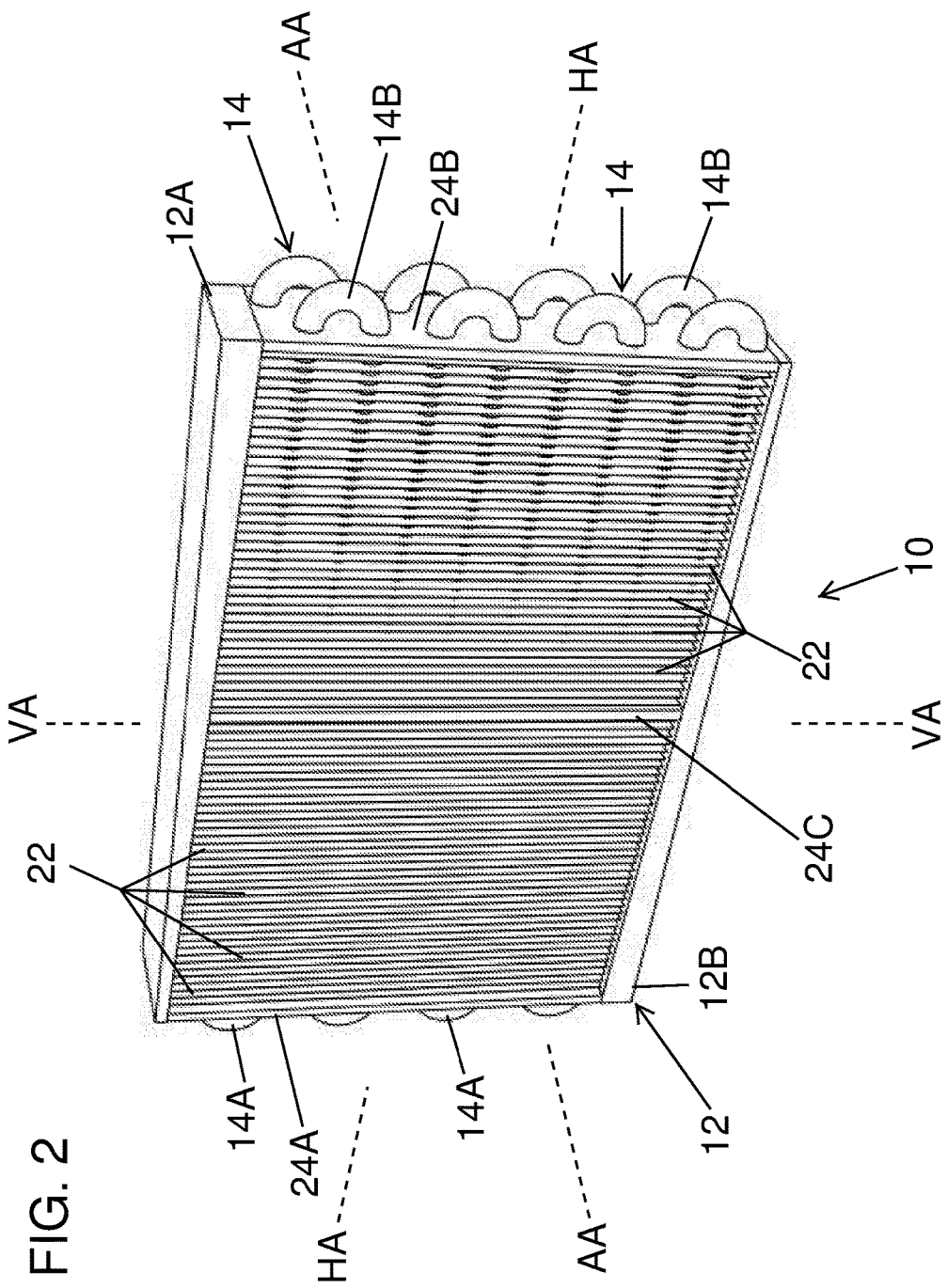
FIG. 2 is a perspective of the heat exchanger.

Referring to FIGS. 2 and 3, the frame 12 is configured to permanently fix the heat pipes 14 in position with respect to the frame. In the illustrated embodiment, the frame 12 is configured to support two columns of the single-loop heat pipes 14, such that the heat pipes are spaced apart along the vertical axis VA in each column. It is expressly contemplated that in other embodiments of a heat exchanger, the frame is configured to support one column or more than two columns of heat pipes spaced apart along the vertical axis. In the illustrated embodiment, the top and bottom legs 14C, 14D of the each heat pipe 14 are generally aligned in the same vertical plane. In other embodiments, the frame 12 can be configured to support one or more of the heat pipes with the heat pipe tilted forward or backward so that the top leg is offset along an air flow axis AA with respect to the bottom leg. The heat pipes 14 in each of the illustrated columns are equally spaced along the vertical axis VA, and the heat pipes in one column are offset from the heat pipes in the other column along the vertical axis. Other embodiments of frames can fix a plurality of heat pipes in other arrangements without departing from the scope of the invention. In the illustrated heat exchanger 10, each column of heat pipes 14 includes four heat pipes spaced apart along the vertical axis VA. Other embodiments can include columns having other numbers of heat pipes. Still other embodiments can fix a plurality of heat pipes at spaced apart positions without arranging the heat pipes in columns. Further it will be understood that depending on the orientation, the columns of heat pipes 14 may be referred to as rows.

The illustrated frame 12 comprises a top frame element 12A that defines a top of the frame and a bottom frame element 12B that defines a bottom of the frame. The frame 12 has a height H that extends along the vertical axis VA from the bottom to the top of the frame when the heat exchanger 10 is installed. The top and bottom frame elements 12A, 12B are show as one-piece components, but it will be understood that either of the top and bottom frame elements can be constructed from more than one piece without departing from the scope of the invention. Each of the top and bottom frame elements 12A, 12B has a first end and a second end that are spaced apart along a width W of the frame that extends along the horizontal axis HA when the heat exchanger 10 is installed. As shown in FIG. 3, side members 20A, 20B can be mounted on the top and bottom frame elements 12A, 12B, at the first and second ends of the frame elements, to cover the first and second end portions 14A, 14B of the heat pipes 14 in certain embodiments. In certain embodiments, the side members 20A, 20B thermally insulate the end portions 14A, 14B from the environment of the heat exchanger 10.

In the illustrated embodiment, each of the top and bottom frame elements 12A, 12B is wedge-shaped. In other embodiments, one or both of the top and bottom frame elements can have other shapes without departing from the scope of the invention. Each of the top and bottom frame elements 12A, 12B has an inner side that is inclined along the width W of the frame 12 and outer side that is substantially parallel to the width. In the illustrated embodiment, the inner side of each of the top and bottom frame elements 12A, 12B is inclined at an angle of incline that is substantially equal to the angle of incline a of the heat pipes 14 (FIG. 4). Thus in one or more embodiments, the inner sides of the top and bottom frame elements 12A, 12B and the top and bottom legs 14C, 14D of each of the heat pipes 14 are oriented substantially parallel to one another. This parallel arrangement may be desirable so that heat transfer fins 22—which are physically connected to the heat pipes 14 to establish direct thermal communication and extend along the vertical axis VA between the inner surfaces of the top and bottom frame elements 12A, 12B at spaced apart locations along the width W of the frame 12—can have substantially the same shape and arrangement.

The frame 12 further comprises heat pipe supports 24A, 24B, 24C that extend generally along the vertical axis VA between the inner sides of the top and bottom frame elements 12A, 12B at spaced apart locations along the width W of the frame when the heat exchanger 10 is installed. The heat pipe supports 24A, 24B, 24C can, in certain embodiments, function as columns that are connected to the top and bottom frame elements 12A, 12B to support the top and bottom frame elements in spaced apart relationship along the vertical axis VA. In the illustrated embodiment, the frame 12 includes a first heat pipe support 24A adjacent a first side of the frame 12, a second heat pipe support 24B adjacent a second side of the frame, and a third heat pipe support 24C at about a midpoint along the width W of the frame. It will be understood that other frames can include other numbers of heat pipe supports. For example, for heat pipes 14 having legs 14C, 14D of relatively long lengths L, it is contemplated that one or more additional heat pipe supports (not shown) can be positioned at spaced apart location(s) between the first heat pipe support 24A and middle heat pipe support 24C and/or at spaced apart location(s) between the second heat pipe support 24B and the middle heat pipe support.

Each of the heat pipe supports 24A, 24B, 24C comprises first and second mounting holes 26A, 26B (e.g., mounting holes of substantially identical shape and arrangement) for respectively receiving segments of the top and bottom legs 14C, 14D therein to support the respective heat pipe at the desired position within the frame 12. The mounting holes 26A, 26B generally function as heat pipe mounting features of the heat pipe supports 24A, 24B, 24C. Other embodiments can use other types of heat pipe mounting features (e.g., clips, fasteners, grooves, underlying support members, etc.) without departing from the scope of the invention. For each heat pipe, the respective mounting holes 26A, 26B formed in the first heat pipe support 24A are located closer to the top of the frame than the respective mounting holes formed in the second heat pipe support 24B and middle heat pipe support 24C. The mounting holes 26A, 26B formed in the middle heat pipe support 24C are also located closer to the top of the frame 12 than the corresponding mounting holes in the second heat pipe support 24B. In the illustrated embodiment, the mounting holes 26A, 26B of the first heat pipe support 24A are offset from the corresponding mounting holes of the second heat pipe support 24B toward the top of the frame by a distance D (FIG. 3) of at least about 0.015-times the distance between the first and second heat pipe supports along the width W of the frame 12. In one or more embodiments, the mounting holes 26A, 26B in the heat pipe supports 24A, 24B, 24C are shaped and arranged to fix each of the heat pipes 14 in the frame 12 so that the heat pipe axis HPA is oriented at an angle of incline a (FIG. 4) with respect to the horizontal axis HA in an inclusive range of from about 1° to about 3° when the heat exchanger 10 is mounted horizontally in the ventilation system V such that the outer sides of the top and bottom frame elements 12A, 12B extend generally parallel to the horizontal axis HA. In one or more embodiments, the offset distance D is a function of the lengths L of the heat pipe legs 14C, 14D and the angle of incline $\alpha$. For example, distance D may be calculated based on the equation $L(\sin \alpha)$.

Referring to FIG. 5, the illustrated frame 12 has a horizontal axis FA that extends generally parallel to horizontal axis HA when the heat exchanger 10 is installed. The frame 12 also has an outer perimeter having a generally rectangular cross-sectional shape along the air flow axis AA but defines an interior 30 having a non-rectangular cross-sectional shape along the air flow axis. For example, the cross-sectional shape of the illustrated frame interior 30 is substantially a rhomboid, though other frames can have other interior cross-sectional shapes without departing from the scope of the invention. In the illustrated embodiment, the top of the frame interior 30 is defined by the inner side of the top frame element 12A, the bottom of the interior is defined by the inner side of the bottom frame element 12B, and the sides of the interior are defined by the first and second heat pipe supports 24A, 24B. Each of the sides of the interior 30 is oriented at a first non-perpendicular angle $\beta$ with respect to one of the top and bottom of the interior and a second non-perpendicular angle $\mu$ with respect to the other of the top and bottom of the interior. In certain embodiments, the first non-perpendicular angle $\beta$ is in an inclusive range of from about 91° to about 93° and the second non-perpendicular angle $\mu$ is in an inclusive range of from about 87° to about 89°. The top, bottom, and sides of the frame interior can have other orientations in other embodiments.

Suitably, the frame 12 substantially seals the perimeter of the interior 30, and the middle heat pipe support 24C is sealed to the heat pipes 14 to define first and second air flow passages 30A, 30B in the interior of the frame that are fluidly separated from one another and the external environment of the heat exchanger 10. For example, the inner sides of the top and bottom frame elements 12A, 12B can be substantially air tight and sealingly connected to the heat pipe supports 24A, 24B, 24C. In addition, the first and second heat pipe supports 24A, 24B can be sealingly engaged with the heat pipes 14 at the mounting holes 26A, 26B to prevent air that is flowing through the passages 30A, 30B from escaping between the heat pipes and the supports. In the illustrated embodiment, the end portions 14A, 14B of the heat pipes 14 are located outside of the passages 30A, 30B (see FIGS. 2 and 3). It is understood that the sides of the frame interior 30 could be sealed in other ways (e.g., using the side members 20A, 20B (FIG. 3)) in other embodiments. The middle heat pipe support 24C is sealed to the heat pipes 14 at each of the mounting holes 26A, 26B and forms an airtight divider between the first air flow passage 30A and the second air flow passage 30B. In the illustrated embodiment, each of the air flow passages 30A, 30B has a rhomboid cross-sectional shape having a top and a bottom defined by the inner sides of the top and bottom frame elements 12A, 12B, respectively, and opposite sides defined by the middle heat pipe support 24C and a respective one of the first and second heat pipe supports 24A, 24B. Thus, in the illustrated embodiment, each of the air flow passages 30A, 30B has a rhomboid cross-sectional shape along the air flow axis AA. As shown in FIG. 3, when the heat pipes 14 are fixed to the frame 12, the upper end sections 14Ca, 14Da of the top and bottom legs 14C, 14D of each heat pipe are located in the first air flow passage 30A and the lower end sections 14Cb, 14Db are located in the second air flow passage 30B.

Each of the air flow passages 30A, 30B extends along the air flow axis AA from an open first end to an open second end. The heat exchanger 10 is configured so that air can flow through each air flow passage 30A, 30B along the air flow axis AA from a location upstream of one of the open ends to a location downstream of the other open end. As explained above, the illustrated heat exchanger 10 includes a plurality of heat transfer fins 22 extending along the vertical axis VA between the top and bottom frame elements 12A, 12B when the heat exchanger is installed. The fins 22 are shaped and arranged so that air flowing through the passages 30A, 30B flows through gaps between the fins. The fins 22 are thermally coupled to the heat pipes 14 so that, as the air flows through the gaps, the fins transfer heat between the air and the heat pipes.

Referring again to FIG. 1, the heat exchanger 10 is configured to be installed horizontally in the ventilation system V such that the top of the frame 12 is generally aligned with the tops of the horizontally spaced supply and exhaust ducts SD, ED and the bottom of the frame is generally aligned with the bottoms of the supply and exhaust ducts. When the heat exchanger 10 is installed in the ventilation system 10, the first air flow passage 30A is in fluid communication with either the supply air duct SD or the exhaust air duct ED and the second air flow passage 30B is in fluid communication with the other of the ducts. Thus, when installed in the ventilation system V, the frame 12 is configured to fix each heat pipe 14 so that the upper end sections 14Ca, 14Da of the top and bottom legs 14C, 14D are received in one of the ducts SD, ED for thermal communication with the respective air stream SS, ES and the lower end sections 14Cb, 14Db of the top and bottom legs are received in the other of the ducts for thermal communication with the other air stream. In the horizontal orientation, the frame 12 also fixes the heat pipes 14 in the ventilation system V so that the heat pipe axis HPA of each heat pipe is inclined with respect to the horizontal axis HA (e.g., at the angle of incline a) and the frame axis FA. As explained below, by fixing the heat pipes 14 so that they are inclined, the frame 12 is configured to enhance the full-year heat recovery of the heat exchanger 10 in comparison to that of a conventional horizontal heat pipe heat exchanger.

As explained above, in certain embodiments the heat exchanger 10 is installed in a climate control system that operates in both a heating mode and a cooling mode during the course of a year. Because of the single-loop configuration of the heat pipes 14, the heat exchanger 10 can provide heat recovery in both the heating mode and the cooling mode even though the heat pipes are installed in the ventilation system at an incline. Before the heat exchanger 10 is installed, the installer can determine whether the heating mode or the cooling mode is a more significant mode of the climate control system. For example, the installer can determine and compare the expected operating duration for each of the heating mode and cooling mode during the course of a year. Likewise the installer can determine and compare the expected energy consumption of the heating mode and cooling mode during the course of the year. In these examples, the installer would determine that the mode having the greater expected operating duration and/or energy consumption during the course of a year is the more significant mode of the climate control system. The more significant mode of operation can also be determined in other ways without departing from the scope of the invention. As explained below, the installer orients the heat exchanger 10 in the ventilation system V in opposite orientations depending on which of the modes of operation is determined to be the more significant mode.

In the more significant heating mode, the exhaust air stream ES (which includes air that was previously heated) is warmer than the supply air stream SS (which can include cool outside air that is to be heated before being circulated through the building). When the heating mode is the more significant mode, the installer installs the heat exchanger 10 in the ventilation system so that the first air passage 30A is in fluid communication with the supply air duct SD and the second air passage 30B is in fluid communication with the exhaust air duct ED. In this configuration, while the climate control system is operating in the heating mode, the upper end sections 14Ca, 14Da of the top and bottom legs 14C, 14D of each heat pipe 14 are positioned for thermal communication with the cool supply air stream SS and function as condensers. The lower end sections 14Cb, 14Db are in thermal communication with the warm exhaust air stream ES and function as evaporators. Heat is transferred from the relatively warm exhaust air stream ES through the heat transfer fins 22 to the lower end sections 14Cb, 14Db. The refrigerant in the heat pipes 14 is evaporated in the heated lower end sections 14Cb, 14Db and flows as a gas upward along the inclined legs 14C, 14D to the upper end sections 14Ca, 14Da. The refrigerant is condensed in the upper end sections 14Ca, 14Da and releases heat that is transferred through the heat transfer fins 22 to the cool supply air stream SS, thereby providing heat recovery between the exhaust and supply air streams. The condensed liquid refrigerant flows downward along the inclined legs 14C, 14D with the assistance of gravity. Thus, when the heating mode is determined to be the more significant mode of a climate control system, the heat exchanger 10 can be installed in the ventilation system so that the heat pipe legs 14C, 14D are inclined to slope downwardly as the legs extend from the supply air duct SD to the exhaust air duct ED. In this configuration in the heating mode, gravity provides a passive pumping effect to the refrigerant flowing through each heat pipe 14. The passive gravitational pumping has been found to substantially increase the heat recovery of the heat exchanger 10 in comparison to a heat exchanger comprising a comparable set of heat pipes oriented horizontally.

In the less significant cooling mode, the exhaust air stream ES (which includes air that was previously cooled) is cooler than the supply air stream SS (which can include warm outside air that is to be cooled before being circulated through the building). In the orientation of the heat exchanger 10 described in the preceding paragraph, while the climate control system is operating in the less significant cooling mode, the upper end sections 14Ca, 14Da of the top and bottom legs 14C, 14D of each heat pipe 14 are positioned for thermal communication with the warm supply air stream SS and function as evaporators. The lower end sections 14Cb, 14Db are in thermal communication with the cool exhaust air stream ES and function as condensers. Heat is transferred from the relatively warm supply air stream SS through the heat transfer fins 22 to the upper end sections 14Ca, 14Da. The refrigerant in the heat pipes 14 is evaporated in the heated upper end sections 14Ca, 14Da and flows as a gas downward along the inclined legs 14C, 14D to the lower end sections 14Cb, 14Db. The refrigerant is condensed in the lower end sections 14Cb, 14Db and releases heat that is transferred through the heat transfer fins 22 to the cool exhaust air stream ES, thereby providing heat recovery between the exhaust and supply air streams. Because of the single-loop configuration of the heat pipes 14, fluid dynamics inside the heat pipe allow the condensed liquid refrigerant to flow upward along the inclined legs 14C, 14D toward the evaporator sections 14Ca, 14Da. In this configuration, the heat recovery of the heat exchanger 10 is slightly less than the heat recovery that would be provided in a heat exchanger comprising a comparable set of heat pipes oriented horizontally. Over the course of a year in which the climate control system operates in both modes, however, the substantial efficiency gains associated with gravitational pumping effect of the inclined heat pipes 14 in the more significant heating mode outweigh the marginal loss of efficiency in the less significant cooling mode. Thus, installing the heat exchanger 10 so that the frame 12 permanently fixes the heat pipes 14 at an incline so that the upper end sections 14Ca, 14Da are positioned in the supply air stream SS are and the lower end sections 14Cb, 14Db are positioned in the exhaust air stream ES enhances the aggregate heat recovery of the heat exchanger 10 in a dual-mode climate control system in which the heating mode is the more significant mode.

Conversely, in a dual-mode climate control system in which the cooling mode is the more significant mode, installing the heat exchanger 10 so that the frame 12 permanently fixes the heat pipes 14 at an incline so that the upper end sections 14Ca, 14Da are positioned in the exhaust air stream ES and the lower end sections 14Cb, 14Db are positioned in the supply air stream SS enhances the aggregate heat recovery of the heat exchanger over the course of a year. Thus, when the installer determines that the cooling mode is the more significant mode of operation of the climate control system, the installer installs the heat exchanger 10 in the ventilation system so that the first air passage 30A is in fluid communication with the exhaust air duct ED and the second air passage 30B is in fluid communication with the supply air duct SD. In this orientation, during the more significant cooling mode, the upper end sections 14Ca, 14Cd of the heat pipes are in thermal communication with the relatively cool exhaust air stream ES (and function as condensers) and the lower end sections 14Cb, 14Db are in thermal communication with the relatively warm supply air stream SS (and function as evaporators). Thus, in the more significant cooling mode, the heat pipes 14 are oriented at an incline to enhance heat recovery through passive gravitational pumping as discussed above. And though heat recovery is somewhat less in the less significant heating mode, heat recovery is still provided, and the marginal decrease caused by the incline are outweighed by the heat recovery increase provided by the incline during the more significant cooling mode.

As can now be seen, the heat exchanger 10 can provide substantial heat recovery in a climate control system that operates in both the heating mode and cooling mode over the course of a year. By installing the heat exchanger 10 in an orientation in which the heat pipes 14 are inclined to utilize gravity to passively pump the condensed liquid refrigerant toward the evaporator sections in the more significant mode of operation of the climate control system, the heat recovery of the heat exchanger is substantially enhanced during the more significant mode. Moreover, because of the single-loop configuration of the heat pipes 14, meaningful heat recovery is still provided during the less significant mode of operation, and the full-year heat recovery of the heat exchanger 10 is substantial. Furthermore, the heat exchanger 10 provides this substantial heat recovery with no moving parts and a frame 12 that can be installed in alignment with a conventional side-by-side arrangement of rectangular ducts SD, ED in a ventilation system V.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A heat exchanger for exchanging heat between first and second air streams respectively flowing through first and second ducts of a ventilation system that are spaced apart along a horizontal axis, the heat exchanger comprising:
   a plurality of heat pipes, each heat pipe having first and second end portions spaced apart along a heat pipe axis and top and bottom legs extending along the heat pipe axis between the first and second end portions and having first and second end sections connected to the first and second end portions, respectively; and
   a frame mounting the heat pipes, the frame being configured for installation in the ventilation system in a horizontal orientation in which the frame fixes each heat pipe so that the first end sections of the top and bottom legs are received in the first duct for thermal communication with the first air stream, the second end sections of the top and bottom legs are received in the second duct for thermal communication with the second air stream, and the heat pipe axis is inclined with respect to the horizontal axis such that the first end sections are positioned above the second end sections.

2. A heat exchanger as set forth in claim 1 wherein the frame has a bottom and a top, the first end portion of each heat pipe being located closer to the top than the second end portion.

3. A heat exchanger as set forth in claim 1 wherein the frame has a top, a bottom, a first side, and a second side and comprises a first heat pipe support adjacent the first side and a second heat pipe support adjacent the second side.

4. A heat exchanger as set forth in claim 3 wherein each of the first and second heat pipe supports comprises a heat pipe mounting feature for each of the heat pipes, each heat pipe mounting feature of the first heat pipe support being located closer to the top than the respective heat pipe mounting feature of the second heat pipe support.

5. A heat exchanger as set forth in claim 4 wherein each heat pipe mounting feature comprises first and second holes for respectively receiving segments of the first and second legs of the respective heat pipe therein.

6. A heat exchanger as set forth in claim 4 wherein each of the heat pipe mounting features of the first heat pipe support is substantially identical to the respective heat pipe mounting feature of the second heat pipe support.

7. A heat exchanger as set forth in claim 4 wherein the heat pipe mounting feature of the first heat pipe support is offset from the heat pipe mounting feature of the second heat pipe support toward the top of the frame by a distance of at least about 0.015-times a distance extending between the first and second heat pipe supports along a width of the frame.

8. A heat exchanger as set forth in claim 1 wherein the frame has a width and comprises at least one of a bottom frame element and a top frame element that has an inner side that is inclined along the width.

9. A heat exchanger as set forth in claim 8 wherein the at least one of the bottom frame element and the top frame element is wedge-shaped.

10. A heat exchanger as set forth in claim 8 wherein the at least one of the bottom frame element and the top frame element has an outer side that is substantially parallel to the width.

11. A heat exchanger as set forth in claim 8 wherein the frame further comprises first and second heat pipe supports extending from the inner side at spaced apart locations along the width and oriented perpendicular to the width.

12. A heat exchanger as set forth in claim 1 wherein the frame defines an interior extending along an air flow axis and the interior has a non-rectangular cross-sectional shape along the air flow axis.

13. A heat exchanger as set forth in claim 12 wherein the interior has a top, a bottom, and opposite first and second sides, at least one of the top and the bottom being oriented at a non-perpendicular angle with respect to one of the first and second sides.

14. A heat exchanger as set forth in claim 13 wherein the non-perpendicular angle is in an inclusive range of from about 87° to about 89°.

15. A heat exchanger as set forth in claim 12 wherein the cross-sectional shape is substantially a rhomboid.

16. A heat exchanger as set forth in claim 1 wherein the heat pipe axis of each of the heat pipes is oriented at an angle of incline in an inclusive range of from about 1° to about 3° in the horizontal orientation of the frame.

17. A heat exchanger as set forth in claim 1 wherein the heat pipes are permanently fixed in position with respect to the frame.

18. A heat exchanger for exchanging heat between first and second air streams respectively flowing through first and second ducts of a ventilation system that are spaced apart along a horizontal axis, the heat exchanger comprising:
 a plurality of heat pipes, each heat pipe having first and second end portions spaced apart along a heat pipe axis and top and bottom legs extending along the heat pipe axis between the first and second end portions and having first and second end sections connected to the first and second end portions, respectively; and
 a frame mounting the heat pipes, the frame having a horizontal axis and being configured for installation in the ventilation system in a horizontal orientation such that the horizontal axis of the frame extends generally parallel to the horizontal axis of the first and second ducts of the ventilation system, the heat pipe axis being inclined with respect to the horizontal axis of the frame such that the heat pipe axis extends at an angle to the horizontal axis of the frame when the frame is installed in the ventilation system.

19. A method of improving efficiency in a ventilation system of a climate control system that is configured to operate in a cooling mode and a heating mode during a year, the ventilation system comprising a supply air duct for receiving a supply air stream and an exhaust air duct for receiving an exhaust air stream that is spaced apart from the supply air duct along a horizontal axis, the method comprising:
 installing a heat exchanger comprising a plurality of heat pipes in the ventilation system, each heat pipe extending in a single continuous loop and having top and bottom legs extending along a heat pipe axis, the step of installing the heat exchanger comprising mounting each heat pipe in the ventilation system so that a first end section of each of the top and bottom legs is in thermal communication with the supply air stream, a second end section of each of the top and bottom legs is in thermal communication with the exhaust air stream, and the heat pipe is permanently fixed in the ventilation system so that the heat pipe axis is inclined with respect to the horizontal axis.

20. A method as set forth in claim 19 further comprising, before installing the heat exchanger, determining whether the cooling mode or the heating mode is a more significant mode of the climate control system, wherein when it is determined that the cooling mode is the more significant mode, the step of installing the heat exchanger comprises permanently fixing each heat pipe in the ventilation system such that the first end section of each of the top and bottom legs is located below the second end section of the respective leg; and
 when it is determined that the heating mode is the more significant mode, the step of installing the heat exchanger comprises permanently fixing each heat pipe in the ventilation system such that the second end section of each of the top and bottom legs is located below the first end section of the respective leg.

* * * * *